Patented Aug. 9, 1949

2,478,776

UNITED STATES PATENT OFFICE 2,478,776

CATALYTIC OXIDATION OF HYDROCARBONS

Martin E. Nash, Bartlesville, Okla., assignor to Phillips Petroleum Company, a corporation of Delaware No Drawing. Application May 7, 1948,
Serial No. 25,805

7 Claims. (Cl. 260—604)

This invention relates to a process for the production of unsaturated aldehydes by the catalytic oxidation of branched chain hydrocarbons. In one of its aspects it relates to the catalytic oxidation of diisopropyl to form acrolein.

The art of oxidation of hydrocarbons is both old and quite extensive, and the resulting oxygenated products have become valuable and useful in various industrial operations. Generally, it is known that under specific conditions various hydrocarbons may be oxidized to produce certain aldehydes or other oxygenated compounds, but considerable difficulty has been experienced in preparing some of these compounds. One specific aspect that emphasizes this difficulty can be found in the fact that, although it is known that acrolein can be prepared by the oxidation of propylene in the presence of mercuric sulfate, it is more practical to prepare acrolein by other methods, such as by the dehydration of glycerol, because, when acrolein is prepared by the oxidation of propylene, the desired aldehyde yield is comparatively small. Obviously, the preparation of acrolein from propylene and mercuric sulfate is both impractical and uneconomical, and an improved process for producing acrolein and other unsaturated aldehydes by the oxidation of hydrocarbons is highly desirable.

An object of this invention is to provide an improved method for the oxidation of hydrocarbons. Another object of this invention is to provide an improved process for the production of unsaturated open-chain aldehydes by the catalytic oxidation of various hydrocarbons. A further object of this invention is to produce acrolein by the catalytic oxidation of 2,3-dimethylbutane. Further and additional objects will appear hereinafter.

I have found that certain hydrocarbons can be oxidized under very specific conditions to form as the principal reaction product unsaturated aldehydes having fewer carbon atoms per molecule than the initial hydrocarbon compound. During the reaction other oxygenated compounds, such as alcohols and ketones, are produced, but the aldehyde content of the reaction products is the principal reaction product. Also, in accordance with my invention, the undesirable oxidation of the hydrocarbon to form carbon dioxide and water is not excessive.

The hydrocarbons which may be utilized in the oxidation process of my invention are those hydrocarbons which are in liquid form at normal conditions of temperature and pressure and which contain at least two adjacent tertiary carbon atoms per molecule. By tertiary carbon atoms I mean those carbon atoms which, when in a hydrocarbon compound, are attached to three other carbon atoms in the same compound. An excellent example of the hydrocarbons which are within the scope of my invention is 2,3-dimethylbutane, more commonly known as diisopropyl. When this compound is represented by structural formula, it is apparent that both the second and third carbon atoms in the straight carbon chain are tertiary carbon atoms. Each of these carbon atoms has a methyl side-chain attached to it, and thus each is attached to three carbon atoms in the compound.

The principal products resulting from the practice of my invention are unsaturated aldehydes, i. e. those aldehydes that have at least one carbon-to-carbon double bond per molecule. These unsaturated aldehydes will also contain fewer carbon atoms per molecule than the hydrocarbon reactants, but the number of carbon atoms per molecule of some of the other oxidation products may be equal to that of the original hydrocarbon. Specifically, when 2,3-dimethylbutane is oxidized according to my invention, the principal reaction product is acrolein. The precise theory and mechanism of the reaction involved in my invention are not clear, but it is evident that, in addition to the oxidation of the hydrocarbon molecules, a cleavage of the carbon chain within some of the hydrocarbon molecules is also effected.

I prefer to effect the oxidation by contacting the hydrocarbon with gaseous oxygen, but the reaction can also be carried out with an oxygen-containing gaseous mixture. Thus, it is within the scope of my invention to add an inert diluent to the gaseous oxygen or to use air. Practically, the addition of an inert diluent provides an effective means for controlling the rate of the oxidation reaction. Conventional gas-liquid contacting apparatus and methods may be used; for example, the oxygen or air may be passed through a fine screen, a porous plate, or other atomizing apparatus, and the fine bubbles so produced may be allowed to pass upward through the liquid hydrocarbon. I also prefer to effect the oxidation in the presence of nitrobenzene as a catalyst, but there are other catalysts which are suitable and useful for the oxidation reaction. It is preferable to use nitrobenzene in a proportion ranging from about 5 to about 50 weight per cent of the hydrocarbon undergoing oxidation.

The hydrocarbon oxidation should be carried out within the temperature range of 0–300° C., and the preferred temperature range is 100–250° C. A more preferred temperature range is 100–200° C. The pressure at which the reaction is effected is not critical and it will depend mainly upon the reaction temperature and the specific hydrocarbon used. The pressure should be sufficiently high to maintain the hydrocarbon in liquid phase and will ordinarily be within the range 50 to 500 p. s. i. For those hydrocarbons having a critical temperature below 300° C., i. e., the temperature above which pressure increases will not effect liquefaction of the hydrocarbon, the oxidation reaction can be carried out either in liquid phase below the critical temperature or in vapor phase between the critical temperature and 300° C. but I prefer to use conditions which permit the use of liquid-phase oxidation. Also, the contact or reaction time is not critical, and it will depend very greatly upon the selected reaction temperature. The contact time range can be more definitely expressed as from 15 minutes to one hour, and this time will not include any induction period that may be required at the particular reaction temperature. In any event the contact time and/or the amount of oxygen used to effect the oxidation reaction will be such that unsaturated aliphatic aldehydes will be the principal products and such that further oxidation, and especially complete oxidation forming carbon dioxide and water, will be maintained at a minimum. By induction period I refer to that period of time during which the reactants are in contact with each other but before which any substantial reaction that produces the desired products takes place.

The product aldehydes are conventionally recovered from the reaction mixture; for example, by fractionation, by solvent extraction or by formation of derivatives from which the aldehydes may be readily regenerated.

*Specific example*

A 150 cc. sample of 2,3-dimethylbutane (diisopropyl) was mixed with approximately 10 cc. of nitrobenzene. While maintaining the mixture at about 200° C. and at a pressure sufficient to maintain a liquid hydrocarbon phase, a stream of air was passed through the mixture for a period of about 40 minutes. An analysis of the resulting product showed an ultimate yield of 50 weight per cent of low-boiling aldehydes, predominately acrolein.

The above example is merely one specific aspect of my invention, and there will be other variations apparent to one skilled in the art.

I claim:

1. A process for producing unsaturated aliphatic aldehydes which comprises contacting in liquid phase a normally liquid open-chain hydrocarbon containing at least two adjacent tertiary carbon atoms with an oxygen-containing gas in the presence of nitrobenzene at a temperature of 0–300° C.

2. A process according to claim 1 wherein the oxygen-containing gas is air.

3. A process for producing acrolein which comprises contacting 2,3-dimethylbutane in liquid phase with an oxygen-containing gas in the presence of nitrobenzene at a temperature of 0–300° C.

4. A process for producing acrolein which comprises contacting 2,3-dimethylbutane in liquid phase with air in the presence of nitrobenzene at a temperature of 100–250° C. for from 15 minutes to 1 hour.

5. A process for producing acrolein which comprises contacting 2,3-dimethylbutane in liquid phase with air in the presence of nitrobenzene at a temperature of about 200° C. for approximately 40 minutes.

6. A process for producing acrolein which comprises contacting 2,3-dimethylbutane in liquid phase with an oxygen-containing gas in the presence of nitrobenzene at a temperature of 100–200° C.

7. The process of claim 6 wherein the temperature is in the range 100–250° C., the oxygen-containing gas is air, the hydrocarbon is 2,3-dimethylbutane and the contact time and oxygen supplied are selected to yield acrolein as a substantial product of the reaction.

MARTIN E. NASH.

No references cited.